W. T. HENLEY.
Submarine Telegraph Cable.
No. 203,619.   Patented May 14, 1878.
  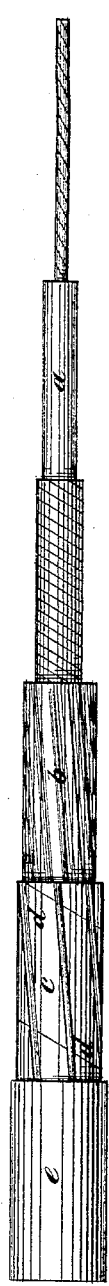 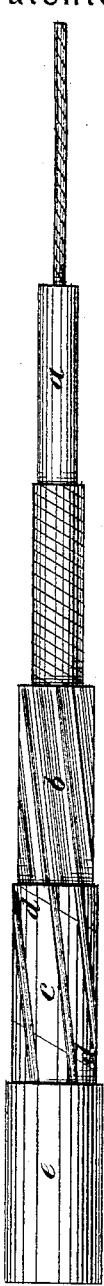 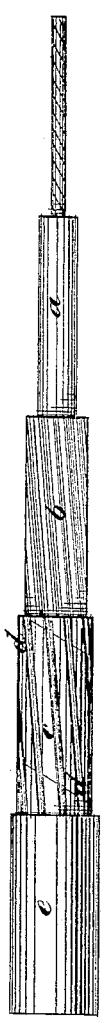 
     
Witnesses
Chas. H. Smith
Geo. T. Pinckney
Inventor
William T. Henley
per
Atty

UNITED STATES PATENT OFFICE.

WILLIAM THOMAS HENLEY, OF PLAISTOW, ENGLAND.

IMPROVEMENT IN SUBMARINE TELEGRAPH-CABLES.

Specification forming part of Letters Patent No. 203,619, dated May 14, 1878; application filed September 4, 1877; patented in England, November 26, 1875.

*To all whom it may concern:*

Be it known that I, WILLIAM THOMAS HENLEY, of Plaistow, in the county of Essex, England, telegraphic engineer, have invented new and useful Improvements in the Construction of Submarine Telegraph-Cables, which improvements are fully set forth in the following specification, reference being had to the accompanying drawings.

I make use of a cable that is covered with india-rubber, and the same is vulcanized or cured by being passed through heated paraffine or ozocerite, and the conductors are covered with strands of fibrous material, with a covering over the same, and steel or iron wires laid in between the strands.

The accompanying drawing shows the construction of these cables.

Figures 1, 2, 3, 4, 5, and 6 are the longitudinal plans; and Figs. 7, 8, 9, 10, 11, and 12, the sections of cables, with four, five, six, ten, and twelve wires.

The core $a$ is composed of one or more copper wires, covered with india-rubber. This is laid on in any usual manner; but the rubber is differently cured for insuring durability.

I use a double vessel or steam-jacketed cylinder, the outer vessel or jacket only being charged with steam, the inner, in which the core is placed, being charged with hot ozocerite, paraffine, or other similar substance, which is still further heated by the steam in the jacket. The paraffine may be subjected to pressure in the cure by means of a force-pump; but the vapor of the paraffine in the cure will generally exert sufficient pressure.

I prefer using more sulphur in the outer coating of india-rubber compound of the core than when cured in the ordinary way.

The advantages of thus treating the india-rubber core are that the india-rubber does not become injured by the action of water or by alternate moisture and dryness, as has been the case with india-rubber cured in the ordinary manner.

I first lay round the core $a$, in long spirals, a number of strong cords or strands, $b$, made of Manila hemp, or other fibrous material. The core may have been previously served with tape or yarn in the usual way or not. It is not necessary unless the cords are twisted very tightly. These may be tarred or not. Around these I lay, in a short spiral, tape or webbing, $c$, formed of jute or other fibrous material, which I prefer to saturate with marine glue, or other compound. I then lay over this wires $d$, (by preference of steel,) in the same direction, and the same length of lay, as the before-mentioned strands or cords $b$, so that the wires lay in the interstices formed by the cords, the webbing $c$ being pressed in by the wires, but preventing the latter from forcing their way between the cords, the object being that the wires $d$ shall compress the strands $b$ of fibrous material, and keep them firm in their places, and that the wires shall only sink so far between them as shown in the figures on the drawing. As many wires as cords may be employed; but for a light cable I prefer only half the number, so that a wire lies in the interstice between every second cord or strand.

Cables have been made in which the core, after being served with yarn, has been covered with a layer of alternate wires and strings of same size, or with wire strands and strings laid on together in long spirals. In a cable thus constructed the only strength is in the wires, as no strain can come on the strings until the wires break; but in one constructed according to these improvements both wires and cords take the strain. The latter will stretch more than the wires; but as the cords stretch they allow the wires to compress them and come nearer the core, and thus the spirals of wire elongate in the same ratio as the strands or cords, the compression of the latter and the webbing preventing the wires from ever forcing between the cords down to the core.

The cords of manila or other strong fibrous material have great strength, and the introduction of fine wires, weighing six hundred-weight per mile, altogether increases the breaking strain of the cable by nearly three tons. After the wires are laid on I serve the whole with a coat of compound webbing, $e$, and afterward pass it through hot marine glue or other similar compound; but, as this outside coating of webbing and compound has been in use before on cables, I lay no claim to this.

A cable thus constructed will bear a much greater strain, either in water or air, than any other form of the same weight.

I claim as my invention—

In a telegraph-cable, the combination, with the core, of strands of fibrous material covered with a serving of fibrous material, and steel or iron wires laid parallel with the strands and between them, substantially as set forth.

W. T. HENLEY.

Witnesses:
   CHAS. BERKLEY HARRIS,
      17 *Gracechurch Street, London.*
   FERDINAND BARBES,
      33 *Chancery Lane, London.*